United States Patent [19]

Breitenbach et al.

[11] Patent Number: 4,927,570
[45] Date of Patent: May 22, 1990

[54] METHOD FOR MANUFACTURING OPTICAL CABLES

[75] Inventors: Otto Breitenbach, Nuremberg; Helmar Hetz, Sulzbach-Rosenber; Friedemann Rous; Josef Ottenreuther, both of Nuremberg, all of Fed. Rep. of Germany

[73] Assignee: Kabelmetal Electro GmbH, Hanover, Fed. Rep. of Germany

[21] Appl. No.: 260,297

[22] Filed: Oct. 20, 1988

[30] Foreign Application Priority Data

Nov. 25, 1987 [DE] Fed. Rep. of Germany ....... 3739879

[51] Int. Cl.$^5$ ............................................... G02B 6/22
[52] U.S. Cl. ..................................... 264/1.4; 264/1.5; 350/96.33
[58] Field of Search ................................ 264/1.4, 1.5; 350/96.33, 96.34

[56] References Cited

U.S. PATENT DOCUMENTS 4,482,204 11/1984 Blyler, Jr. et al. ................ 427/54.1
4,641,916 2/1987 Oestreich et al. ................ 350/96.34
4,741,597 5/1988 Broer ................................ 350/96.33

FOREIGN PATENT DOCUMENTS 209641 1/1987 European Pat. Off. ......... 350/96.34

*Primary Examiner*—James Lowe
*Attorney, Agent, or Firm*—James C. Jangarathis

[57] ABSTRACT

Method for manufacturing an improved optical cable comprised of a cable core including optical fibers. The method includes the steps of continuously drawing a cable core through a sheathing station that forms a sheath of halogen free, low flammability material of high density about the cable core; continuously drawing the sheathed cable core through a jacketing station that forms a jacket of halogen free, low flammability, cross-linkable plastic material about the sheath; and continuously drawing the sheated and jacketed cable core through a high radiation source that causes a cross-linking of the jacket material, while the sheath prevents any radiation from penetrating the optical fibers of the cable core.

5 Claims, 1 Drawing Sheet

METHOD FOR MANUFACTURING OPTICAL CABLES

The invention relates to a method of manufacturing an improved optical cable comprised of a cable core including optical fibers; a sheath of high density material formed about the cable core; and an outer jacket comprised of a material that is cross-linked by the application of high energy radiation thereto.

BACKGROUND OF THE INVENTION

Optical cables comprised of optical fibers positioned within sheaths of insulating material are priorly known. Optical fibers, in contrast to metallic conductors, are highly flexible, have minimal dimensions, and are not materially affected by ambient electric and magnetic fields. They are, however, highly susceptible to mechanical damage and should not be bent in small turns, and should be protected from tension forces.

It is priorly known to cross-link plastic outer jackets of communication cables to achieve mechanical and thermic durability. Such cross-linking may be achieved by the employment of chemical additives or high energy radiation. In the case of chemical additives, high temperatures and high pressures are usually present. These conditions render chemical cross-linking inappropriate for optical cables since there would be considerable risk of damage to the sensitive optical fibers, notwithstanding the protective plastic coatings formed thereabout. In the case of using high energy radiation for cross-linking the outer jackets of optical cables, the penetration of radiation into the optical fibers would destroy the ability of such fibers to transmit optical signals, i.e., it would render the optical fibers opaque.

OBJECTS OF THE INVENTION

An object of the present invention is to provide a novel method of manufacturing an optical cable, including a cable core comprised of optical fibers, and a sheath and outer jacket formed in succession thereabout, for effectively shielding the optical fibers from radiation while cross-linking the outer jacket by the use of high energy radiation.

Another object of the present invention is to provide a novel optical cable which is of improved mechanical and thermic durability, is fire resistant, and does not emit toxic fumes when subjected to fire conditions.

SUMMARY OF THE INVENTION

These and other objects of the present invention are achieved by continuously drawing a cable core through a sheathing station that forms a sheath of halogen free, low flammability material of high density about the cable core; continuously drawing the sheathed cable core through a jacketing station that forms an outer jacket of halogen free, low flammability cross-linkable plastic material about the sheath; and continuously drawing the sheathed and jacketed cable core through a radiation source that causes a cross-linking of the jacket material while the sheath prevents any radiation from penetrating the optical fibers of the cable core.

As a result of the cross-linking, the jacket acquires greater durability and resistance with respect to mechanical and thermic stresses Since the jacket material is halogen free and of low flammability, substantial fire protection is provided to the optical fibers within the cable core; while avoiding the discharge of toxic fumes in a fire environment The high energy radiation step of cross-linking the jacket material permits continuous drawing of the sheathed and jacketed cable core in one continuous throughput operation. The degree of radiation penetration is selected so as not to extend beyond the jacket wall thickness; while the sheath is comprised of a high density material that acts as a screen that absorbs any radiation that may unavoidably penetrate beyond the jacket and endanger the optical transmission qualities of the optical fibers of the cable core.

BRIEF DESCRIPTION OF THE DRAWINGS

A better understanding of the present invention as well as the object and advantages thereof will become apparent upon consideration of the following detailed disclosure thereof, especially when taken with the accompanying drawings, wherein.

DESCRIPTION OF THE PREFERRED EMBODIMENT

Figure 1:
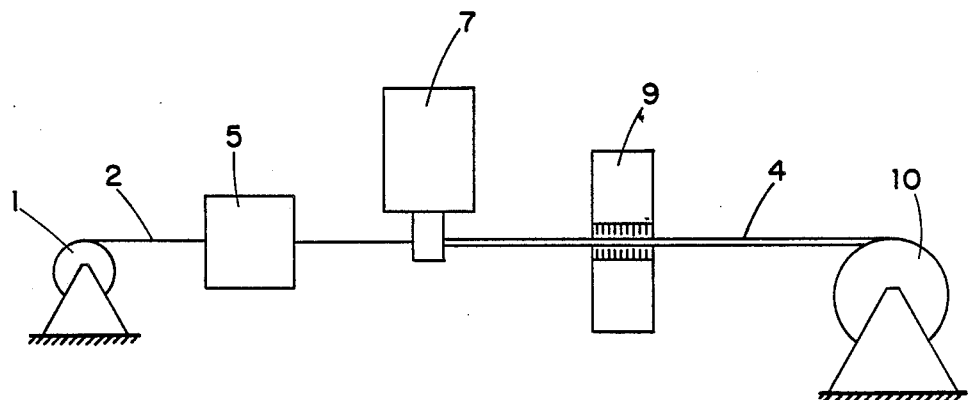
FIG. 1 is a diagrammatic representation of apparatus for manufacturing an improved optical cable.
Figure 2:
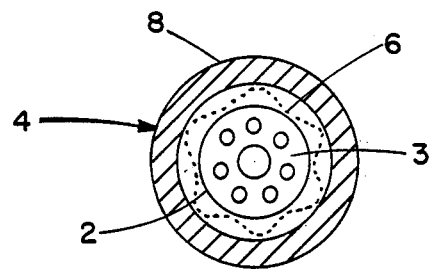
FIG. 2 is a cross-sectional view of a partially fabricated optical cable manufactured with the apparatus of FIG. 1.

Referring to FIG. 1, a cable core 2 comprised of a plastic covered, optical fiber is drawn from a supply drum 1, toward and through a sheathing station 5. In the preferred embodiment the structure of cable core 2 is comprised of plastic covered, optical fibers at its center, and encapsulated thereabout a tension relief cover 3, including metallic members, as indicated in FIG. 2. As the cable core 2 is drawn through the sheathing station 5, a sheath 6 is formed concentrically about the cable core 2. The sheath 6 is comprised of a high density material applied by extrusion or by wrapping techniques. Examples of appropriate sheath materials are highly filled plastics applied by extrusion; metallic bands wound about the cable core 2; or a mesh of wires formed about the cable core 2 with a density sufficient to achieve at least 95% coverage of the cable core.

From the sheathing station 5, the sheathed cable core is first longitudinally drawn through a jacketing station 7 that applies an outer jacked 8 concentrically about the sheath 6; and then through a radiation source 9 that provides high energy radiation into the outer jacket for cross-linking the jacket material. The sheathed and jacketed cable core, i.e., the completed optical cable 4, is subsequently wound on a driven take-up drum 10.

In the case wherein the sheath 6 is comprised of a metallic band, at least one layer of the band is wound in an overlapping manner about the cable core 2. Preferred sheath metals are copper, lead and steel. Alternatively, the sheath is comprised of the combination of a wound band and a wire mesh formed thereabout. In the case wherein the sheath is comprised of a halogen free, low flammability plastic material of high density (for example, polyolefin compounded with a filler material and whose density is above 1.45 g/cm$^3$), the filler materials may be iron powder or chalk.

The jacket 8 may comprise modified polyolefins or polyurethanes with fire retarding agents. For example, polyethylene-copolymerisates such as polyethylene-vinyl acetate copolymers is a suitable modified polyolefin, while aluminum hydroxide and magnesium hydroxide are suitable fire retarding agents. The jacket 8 may comprise substantially equal parts polyolefin and fire retarding agents. In a preferred embodiment 120 parts of an aluminum hydroxide were added to 100 parts of a polyethylene-copolymerisate. In another embodiment 120 parts of magnesium hydroxide were added to 100 parts of a polyethylene - vinyl acetate copolymer. The term "modified" means a mixture of base polymers with additional substances for age prevention, axially crosslinking or fire prevention.

The thickness of the jacket 8 and the anode voltage of the radiation source 9 are selected to achieve full penetration of the radiation into the jacket 8, and thus complete cross-linking thereof; while radiation peneration beyond the jacket 8 is absorbed by the shield 6.

While the invention has been described in connection with an exemplary embodiment thereof, it will be understood that many modifications will be apparent to those of ordinary skill in the art and that this application is intended to cover any adaptations or variations thereof. Therefore, it is manifestly intended that the invention be only limited by the claims and equivalents thereof.

What is claimed:

1. Method for manufacturing an optical cable comprising the steps of:

continuously drawing a cable core in a longitudinal direction through a sheathing station for forming a sheath about said cable core, said cable core including at least one optical fiber for the provision of a continuous light transmission path, said forming of said sheath comprising the successive steps of winding at least one layer of a metallic band in an overlapping manner about said cable core and then forming a wire mesh of metallic wires about said metallic band, said metallic band and said wire mesh in combination comprising said sheath of said cable core;

continuously drawing the sheathed cable core in a longitudinal direction through a jacketing station for forming an outer jacket of halogen free, crosslinkable plastic material about said sheath; and continuously drawing the sheathed and jacketed cable core in a longitudinal direction through an energy radiation source having a radiation penetration selected so as to extend into the outer jacket but not beyond the thickness thereof, for causing a cross-linking of said plastic material of said outer jacket.

2. Method in accordance with claim 1, wherein said sheath shields said cable core from the radiation of said radiation source as the jacketed and sheathed cable core is drawn through said radiation.

3. Method in accordance with claim 1, wherein copper is used as the material for said metallic band and said wire mesh.

4. Method in accordance with claim 1, wherein steel is used as the material for said metallic band and said wire mesh.

5. Method in accordance with claim 1, wherein a modified polyolefin with a fire protection substance added is used for the said jacket.

* * * * *